(12) United States Patent
Kim et al.

(10) Patent No.: US 9,306,194 B2
(45) Date of Patent: Apr. 5, 2016

(54) BATTERY MODULE ASSEMBLY FOR VEHICLE'S BATTERY PACK

(71) Applicant: LG CHEM, LTD., Seoul (KR)

(72) Inventors: Sung-Jong Kim, Daejeon (KR); Chae-Yang Cho, Daejeon (KR); Soon-Ho Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/548,075

(22) Filed: Nov. 19, 2014

(65) Prior Publication Data

US 2015/0079449 A1 Mar. 19, 2015

Related U.S. Application Data

(63) Continuation of application No. PCT/KR2014/003566, filed on Apr. 23, 2014.

(30) Foreign Application Priority Data

Apr. 29, 2013 (KR) .................. 10-2013-0047475
May 31, 2013 (KR) .................. 10-2013-0063090

(51) Int. Cl.
*H01M 2/26* (2006.01)
*H01M 2/02* (2006.01)
(Continued)

(52) U.S. Cl.
CPC .............. *H01M 2/0247* (2013.01); *H01M 2/06* (2013.01); *H01M 2/08* (2013.01); *H01M 2/1077* (2013.01);
(Continued)

(58) Field of Classification Search
CPC .............. H01M 2/206; H01M 2/1077; H01M 10/5034; H01M 2/0247; H01M 2220/20
See application file for complete search history.

(56) References Cited

U.S. PATENT DOCUMENTS 8,507,119 B2  8/2013  Itoi et al.
2011/0287287 A1  11/2011  Kang
(Continued)

FOREIGN PATENT DOCUMENTS

CN  201708198 U  1/2011
CN  102195023 A  9/2011
(Continued)

OTHER PUBLICATIONS

International Search Report issued in PCT/KR2014/003566, mailed on Jul. 28, 2014.
(Continued)

*Primary Examiner* — Gary Harris
(74) *Attorney, Agent, or Firm* — Birch, Stewart, Kolasch & Birch, LLP

(57) ABSTRACT

Disclosed is a battery module assembly for a vehicle's battery pack, which has four battery modules, among which two battery modules are arranged in parallel and two battery modules are stacked and provided on the two battery modules arranged in parallel, wherein cylindrical secondary battery cells respectively included in the battery modules are electrically connected in parallel by means of plates respectively disposed at tops of the two battery modules arranged in parallel, wherein the two battery modules arranged in parallel are electrically connected in parallel by means of a lower metal plate disposed on the two battery modules arranged in parallel, wherein cylindrical secondary battery cells respectively included in the battery modules are electrically connected in parallel by means of metal plates respectively disposed at tops and bottoms of the two battery modules stacked on the two battery modules arranged in parallel, and wherein the four battery modules are electrically connected in series. Therefore, it is possible to provide a stable and economic battery module assembly including a plurality of secondary battery cells.

6 Claims, 7 Drawing Sheets

(51) Int. Cl.
*H01M 2/10* (2006.01)
*H01M 2/20* (2006.01)
*H01M 10/65* (2014.01)
*H01M 2/06* (2006.01)
*H01M 2/08* (2006.01)
*H01M 2/30* (2006.01)
*H01M 10/04* (2006.01)
*H01M 10/625* (2014.01)

(52) U.S. Cl.
CPC .............. *H01M 2/206* (2013.01); *H01M 2/305* (2013.01); *H01M 10/0422* (2013.01); *H01M 10/5034* (2013.01); *H01M 10/625* (2015.04); *H01M 2220/20* (2013.01)

(56) References Cited

U.S. PATENT DOCUMENTS

| | | |
|---|---|---|
| 2012/0121967 A1 | 5/2012 | Nakamura et al. |
| 2012/0231309 A1* | 9/2012 | Itoi et al. .......................... 429/99 |
| 2013/0002016 A1* | 1/2013 | Furukawa et al. ............. 307/9.1 |

FOREIGN PATENT DOCUMENTS

| | | |
|---|---|---|
| CN | 102447081 A | 5/2012 |
| CN | 102468457 A | 5/2012 |
| CN | 203850370 U | 9/2014 |
| EP | 2 355 205 A1 | 8/2011 |
| JP | 2006-244982 A | 9/2006 |
| JP | 2007-95483 A | 4/2007 |
| JP | 2011-049014 A | 3/2011 |
| JP | 2011-154883 A | 8/2011 |
| KR | 10-2010-0088030 A | 8/2010 |
| KR | 10-2012-0068830 A | 6/2012 |

OTHER PUBLICATIONS

PCT/ISA/237—Issued in PCT/KR2014/003566, mailed on Jul. 28, 2014.

* cited by examiner

BATTERY MODULE ASSEMBLY FOR VEHICLE'S BATTERY PACK

CROSS-REFERENCE TO RELATED APPLICATION

The present application is a continuation of International Application No. PCT/KR2014/003566 filed on Apr. 23, 2014, which claims priority to Korean Patent Application No. 10-2013-0047475 filed on Apr. 29, 2013 and Korean Patent Application No. 10-2013-0063090 filed on May 31, 2013 in the Republic of Korea, the disclosures of which are incorporated herein by reference.

BACKGROUND OF THE DISCLOSURE

1. Field of the Disclosure

The present disclosure relates to a battery module assembly, and more particularly, to an electric connection between battery modules in a battery module assembly for a vehicle's battery pack.

2. Description of the Related Art

A secondary battery having good application to various product groups and good electric characteristics such as high energy density is widely applied to not only portable devices but also an electric vehicle (EV) or a hybrid electric vehicle (HEV) driven by an electric driving source. The secondary battery has a primary advantage of greatly reducing the use of fossil fuels and a secondary advantage of generating no byproduct in use of energy, and thus attracts attention as a new energy source for enhancing environment-friendly and energy-efficient properties.

Lithium ion batteries, lithium polymer batteries, nickel cadmium batteries, nickel hydrogen batteries, nickel zinc batteries or the like are widely used as secondary batteries at the present. Such a unit secondary battery cell has an operating voltage of about 2.5V to 4.2V. Therefore, if a higher output voltage is demanded, a plurality of secondary battery cells may be connected in series to configure a battery pack. In addition, according to a charge/discharge capacity demanded to the battery pack, a plurality of secondary battery cells may also be connected in parallel to configure a battery pack. Therefore, the number of secondary battery cells included in the battery pack may be various set depending on a demanded output voltage or charge/discharge capacity.

Meanwhile, if a plurality of secondary battery cells is connected in series or in parallel to configure a battery pack, the secondary battery cells included in the battery pack should be firmly connected electrically and mechanically. Therefore, a stable and economic design is required for a battery module assembly and a battery pack in order to ensure firm connection of secondary battery cells.

SUMMARY OF THE DISCLOSURE

The present disclosure is designed to solve the problems of the related art, and therefore the present disclosure is directed to providing a battery module assembly for a vehicle's battery pack.

In one aspect of the present disclosure, there is provided a battery module assembly having four battery modules, among which two battery modules are arranged in parallel and two battery modules are stacked and provided on the two battery modules arranged in parallel, wherein cylindrical secondary battery cells respectively included in the battery modules are electrically connected in parallel by means of plates respectively disposed at tops of the two battery modules arranged in parallel, wherein the two battery modules arranged in parallel are electrically connected in parallel by means of a lower metal plate disposed on the two battery modules arranged in parallel, wherein cylindrical secondary battery cells respectively included in the battery modules are electrically connected in parallel by means of metal plates respectively disposed at tops and bottoms of the two battery modules stacked on the two battery modules arranged in parallel, and wherein the four battery modules are electrically connected in series.

According to an embodiment of the present disclosure, the metal plate may be made of any one selected from the group consisting of nickel, copper, brass and nickel-plated copper.

According to an embodiment of the present disclosure, the metal plate may be connected to the cylindrical secondary battery cells included in each battery module by means of resistance welding, ultrasonic welding, laser welding or conductive adhesive.

According to an embodiment of the present disclosure, the metal plate may have a thickness of 0.1 mm to 0.4 mm.

The battery module assembly according to the present disclosure may further include a bus bar configured to electrically connect the two battery modules arranged in parallel and the two battery modules stacked thereon. In this case, the plates respectively disposed at the tops of the two battery modules arranged in parallel may have a greater area in comparison to each battery module, a region of each plate beyond the area of the battery module may be vertically folded, and the bus bar may be interposed between the vertically folded portion and the plates respectively disposed at the bottoms of the stacked two battery modules.

In an aspect of the present disclosure, it is possible to provide a stable and economic battery module assembly including a plurality of secondary battery cells.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
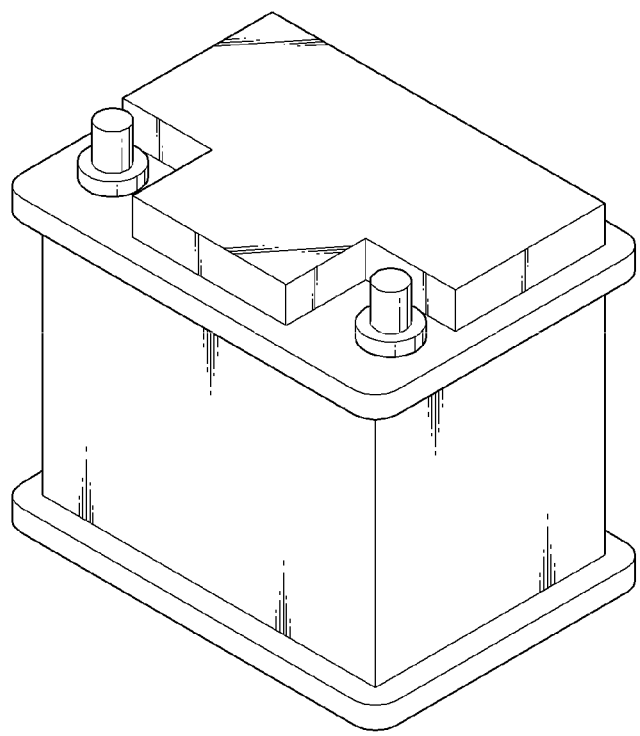
FIG. 1 is a perspective view showing a battery pack including a battery module assembly according to an embodiment of the present disclosure.

FIG. 1 is a perspective view showing a battery pack 1 including a battery module assembly 50 according to an embodiment of the present disclosure.

The battery pack 1 depicted in FIG. 1 is a vehicle's battery pack 1 which may be mounted to a vehicle, a hybrid electric vehicle (HEV), an electric vehicle (EV) or the like.

Preferably, the battery pack 1 may have a size according to the standards for vehicle's batteries. Therefore, the battery pack 1 may have a hexagonal shape as a whole.

Also preferably, the battery module assembly 50 may also have a size according to the standards for vehicle's batteries. However, the battery pack 1 and the battery module assembly 50 are not limited to the above sizes, and their lengths, widths and heights may be set in various ways.

Figure 2:
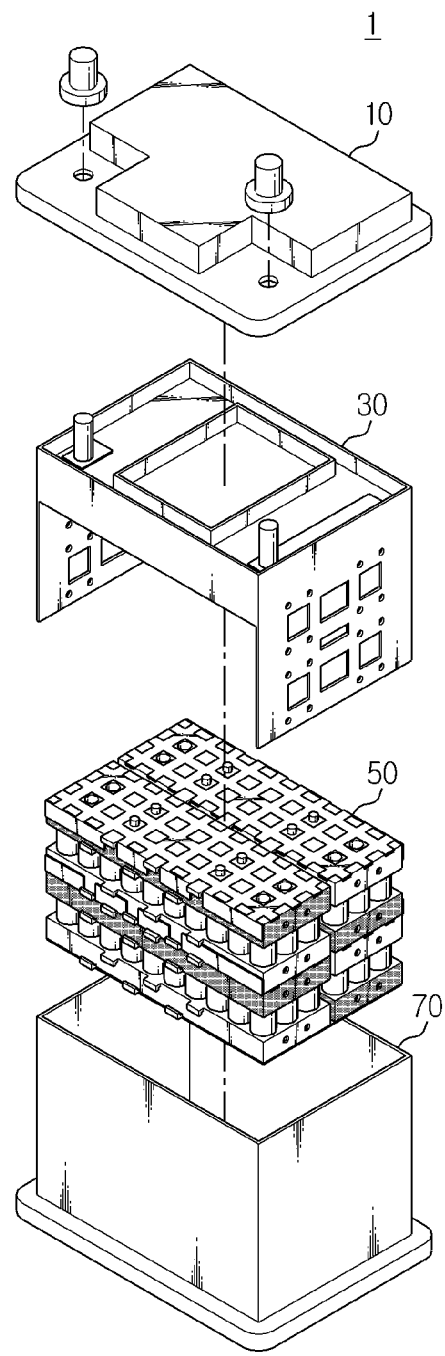
FIG. 2 is an exploded perspective view showing a battery pack including a battery module assembly according to an embodiment of the present disclosure.

FIG. 2 is an exploded perspective view showing a battery pack 1 including a battery module assembly 50 according to an embodiment of the present disclosure.

The battery module assembly 50 according to an embodiment of the present disclosure is connected to an inner case 30 and included between an upper pack case 10 and a lower pack case 70 to configure the battery pack 1.

Figure 3:
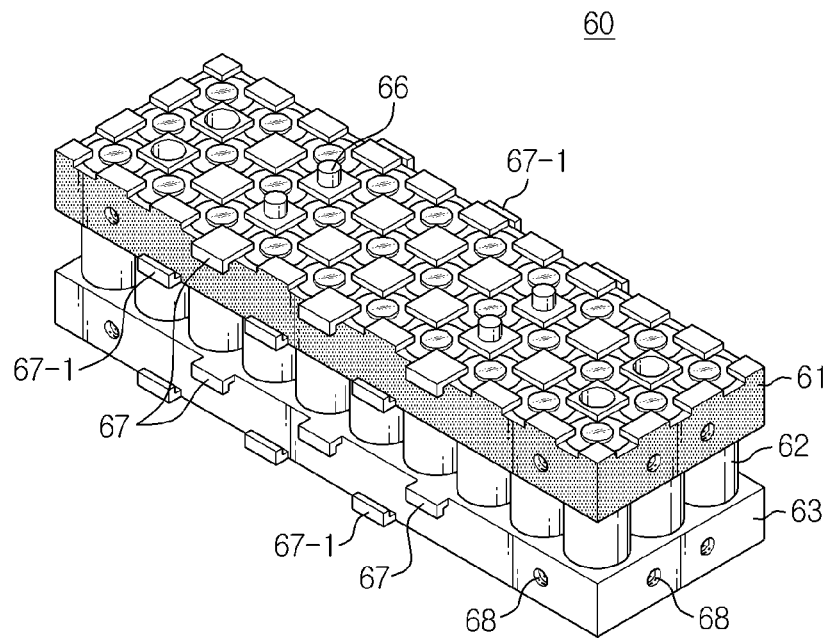
FIG. 3 is a perspective view showing battery modules of the battery module assembly according to an embodiment of the present disclosure.

FIG. 3 is a perspective view showing battery modules 60 of the battery module assembly 50 according to an embodiment of the present disclosure.

Referring to FIG. 3, the battery module 60 is configured so that a plurality of cylindrical secondary battery cells 62 (hereinafter, also referred to as 'cells') is interposed between an upper frame 61 and a lower frame 63. For convenience, it will be assumed that an electrode of a cell 62 exposed toward the upper frame 61 is a high potential electrode (+), and an electrode of a cell 62 exposed toward the lower frame 63 is a low potential electrode (−). In addition, for better identification of the upper frame 61 and the lower frame 63 with naked eyes, the upper frame 61 is depicted in a dark color and the lower frame 63 is depicted in a light color.

The battery pack 1 according to an embodiment of the present disclosure may have an operating voltage of 12V when being used for a vehicle. In addition, a secondary battery cell 62 according to an embodiment of the present disclosure may have an operating voltage of 3V. Therefore, four battery modules 60 may be connected in series to configure a battery module assembly 50.

Hereinafter, the battery module assembly 50 composed of battery modules 60 shown in FIG. 3 will be described. For reference, the terms "upper", "lower", "top" and "bottom" used in the specification indicates locations based on the drawings.

The battery module assembly 50 according to an embodiment of the present disclosure is composed of four battery modules 60. Hereinafter, the four battery modules 60 will be classified with numbers.

Figure 4:
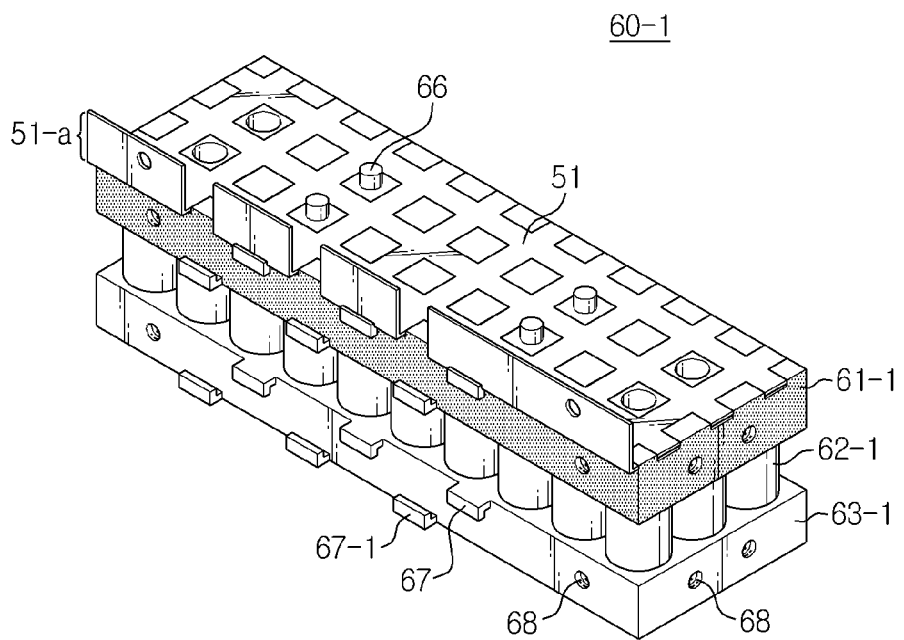
FIG. 4 is a perspective view showing a $1^{st}$ battery module among four battery modules included in a battery module assembly according to an embodiment of the present disclosure.

FIG. 4 is a perspective view showing a $1^{st}$ battery module 60-1 among four battery modules included in the battery module assembly 50 according to an embodiment of the present disclosure.

Referring to FIG. 4, it may be found that a plate 51 is added to an upper frame 61-1 of the battery module 60 depicted in FIG. 3. The plate 51 is made of metal and electrically connected to a high potential terminal of the battery module 60-1. Therefore, high potential terminals of the cells 62-1 included in the battery module 60-1 may be electrically connected in parallel by the plate 51.

According to an embodiment of the present disclosure, the plate 51 may be made of any one selected from the group consisting of nickel, copper, brass and nickel-plated copper. These materials are just examples, and the plate 51 may be made of any kind of metal which may be easily replaced by those having ordinary skill in the art.

According to an embodiment of the present disclosure, the plate 51 has a thickness of 0.1 mm to 0.4 mm. The thickness may be set in various ways in consideration of rigidity, electric conductivity or the like according to properties of the metal.

According to an embodiment of the present disclosure, the plate 51 and the cells 62-1 are connected by means of resistance welding, ultrasonic welding, laser welding or conductive adhesive.

The entire area of the plate 51 is greater than an area of the upper frame 61-1 of the $1^{st}$ battery module 60-1. In addition, a part of the plate 51, namely a region 51-a beyond the area of the upper frame 61-1 of the $1^{st}$ battery module 60-1, is folded vertically. When configuring the battery module assembly 50 later, the folded region 51-a is used for mechanical and electric connection with a battery module 60-3 (see FIG. 7) stacked thereon.

Figure 5:
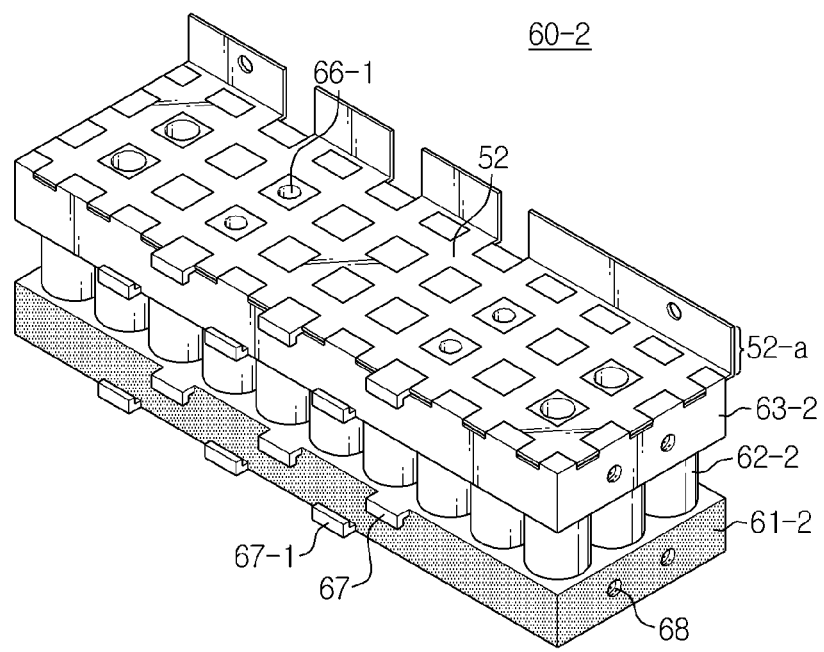
FIG. 5 is a perspective view showing a $2^{nd}$ battery module among four battery modules included in a battery module assembly according to an embodiment of the present disclosure.

FIG. 5 is a perspective view showing a $2^{nd}$ battery module 60-2 among four battery modules included in the battery module assembly 50 according to an embodiment of the present disclosure.

Referring to FIG. 5, it may be found that the $2^{nd}$ battery module 60-2 has a turn-over shape of the battery module 60 depicted in FIG. 3. In addition, it may also be found that a plate 52 is added to a lower frame 63-2 of the $2^{nd}$ battery module 60-2. The plate 52 is made of metal and electrically connected to a low potential terminal of the battery module 60-2. Therefore, low potential terminals of the cells 62-2 included in the $2^{nd}$ battery module 60-2 may be electrically connected in parallel by means of the plate 52.

Material, thickness and welding method of the plate 52 are substantially identical to those of the plate 51 of FIG. 4.

The entire area of the plate 52 is greater than an area of the lower frame 63-2 of the $2^{nd}$ battery module 60-2. In addition, a part of the plate 52, namely a region 52-a beyond the area of the lower frame 63-2 of the $2^{nd}$ battery module 60-2, is folded vertically. When configuring the battery module assembly 50 later, the folded region 52-a is used for mechanical and electric connection with a battery module 60-4 (see FIG. 7) stacked thereon.

Figure 6:
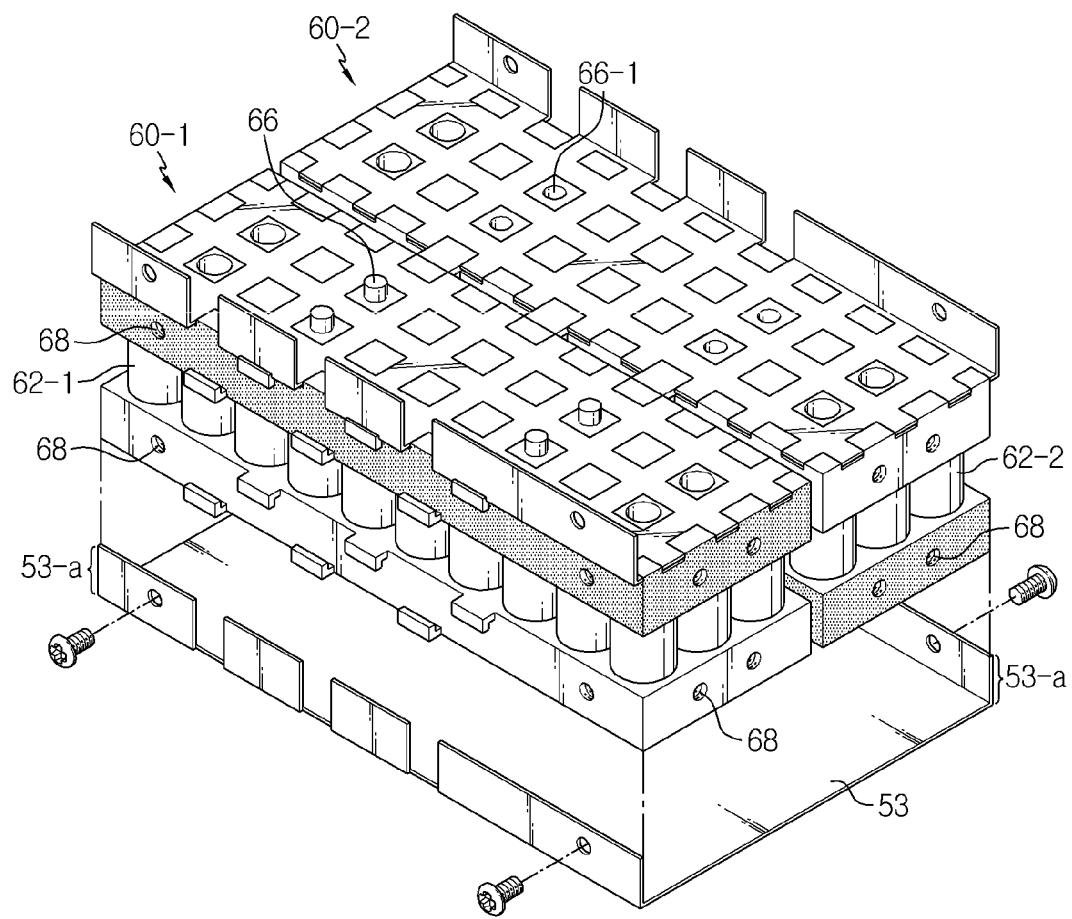
FIG. 6 is an exploded perspective view showing that the $1^{st}$ and $2^{nd}$ battery modules among four battery modules included in a battery module assembly according to an embodiment of the present disclosure are connected.

FIG. 6 is an exploded perspective view showing that the 1st and 2nd battery modules 60-1, 60-2 among four battery modules included in the battery module assembly 50 according to an embodiment of the present disclosure are connected.

Referring to FIG. 6, it may be found that a plate 53 is disposed at bottoms of the 1st and 2nd battery modules 60-1, 60-2.

The plate 53 is made of metal and electrically connected to the low potential terminal of the 1st battery module 60-1. Therefore, low potential terminals of the cells 62-1 included in the 1st battery module 60-1 may be electrically connected in parallel by means of the plate 53. Meanwhile, the plate 53 is made of metal and electrically connected to a high potential terminal of the 2nd battery module 60-2. Therefore, high potential terminals of the cells 62-2 included in the 2nd battery module 60-2 may be electrically connected in parallel by means of the plate 53. Simultaneously, the plate 53 has an area including both the 1st battery module 60-1 and the 2nd battery module 60-2. Therefore, the low potential terminal of the 1st battery module 60-1 and the high potential terminal of the 2nd battery module 60-2 may be electrically connected in series.

Material, thickness and welding method of the plate 53 are substantially identical to those of the plate 51 of FIG. 4.

According to an embodiment of the present disclosure, the entire area of the plate 53 is greater than the sum of areas of the 1st battery module 60-1 and the 2nd battery module 60-2. In addition, a part of the plate 53, namely a region 53-a beyond the sum area of the 1st battery module 60-1 and the 2nd battery module 60-2, is folded vertically. Moreover, threads 68 are formed at a side of the 1st battery module 60-1 and a side of the 2nd battery module 60-2. Therefore, a screw hole may be formed in the vertically folded region 53-a, and the plate 53 may be mechanically connected to the 1st battery module 60-1 and the 2nd battery module 60-2 by means of the threads 68 and screws.

According to an embodiment of the present disclosure, in the battery module 60, connection units 67, 67-1 are formed at one side of the upper frame 61 or the lower frame 63 for a connection to another battery module.

Referring to FIG. 3 again, the connection units 67, 67-1 formed at the sides of the upper frame 61 and the lower frame 63 of the battery module 60 are depicted. As described above, in the battery pack 1 according to an embodiment of the present disclosure, four battery modules 60 configure the battery module assembly 50 (see FIG. 2). At this time, the battery module may be mechanically coupled to another battery module 60 adjacent to a side thereof by means of the connection units 67, 67-1.

According to an embodiment of the present disclosure, the connection units 67, 67-1 have 'ㄱ' or 'ㄴ' shape. The connection unit 67 having a 'ㄱ' shape and the connection unit 67-1 having a 'ㄴ' shape may be connected to each other to prevent the battery module 60 from being deviated in a horizontal direction. For this, when configuring the battery module assembly 50 battery modules 60 adjacent to each other may be arranged so that the connection unit 67 having a 'ㄱ' shape and the connection unit 67-1 having a 'ㄴ' shape are connected to each other.

If the connection units 67, 67-1 are formed at the sides of the 1st battery module 60-1 and the 2nd battery module 60-2, the 1st battery module 60-1 and the 2nd battery module 60-2 may be mechanically connected by means of the connection units 67, 67-1. The connection units 67, 67-1 enhance a mechanical coupling power among the battery modules 60 of the battery module assembly 50.

Figure 7:
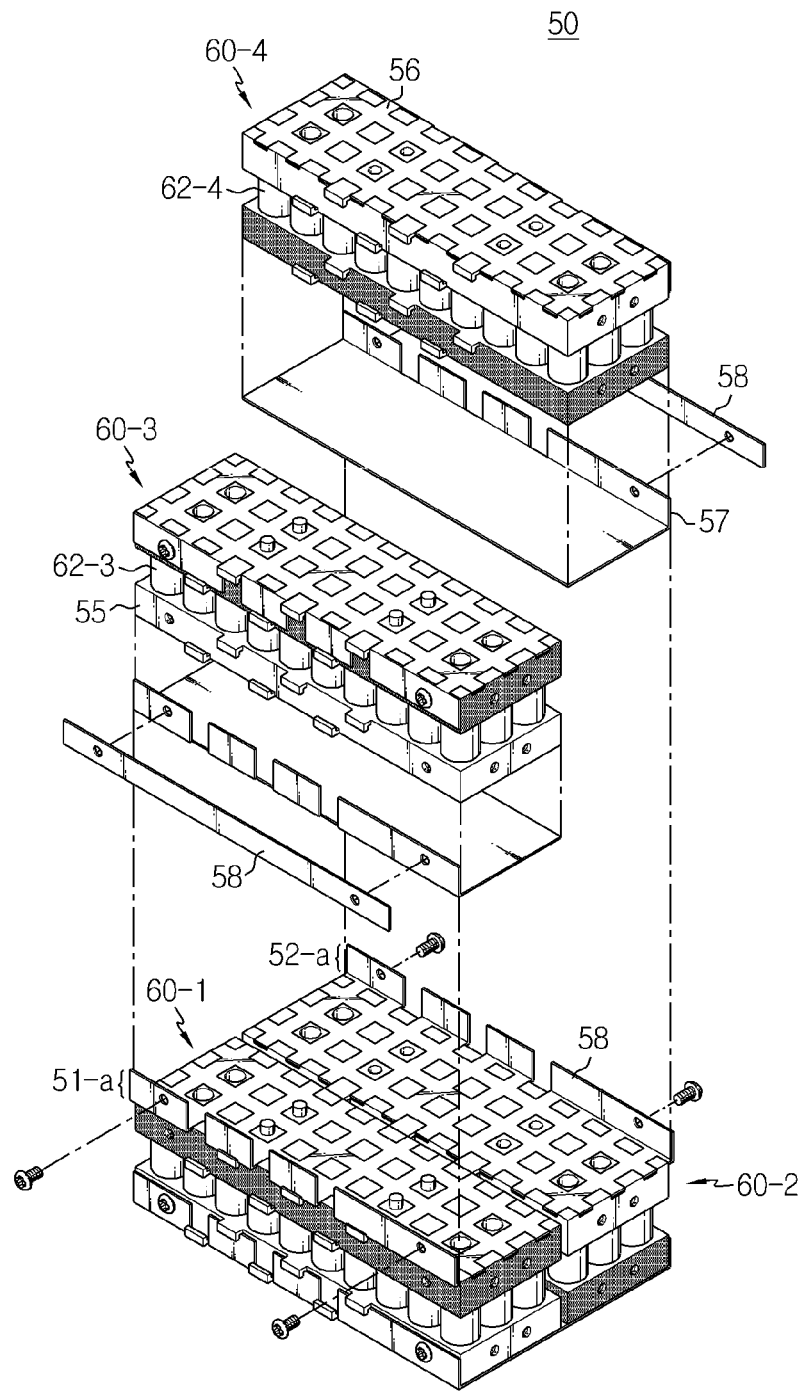
FIG. 7 is an exploded perspective view showing that $3^{rd}$ and $4^{th}$ battery modules among four battery modules included in a battery module assembly according to an embodiment of the present disclosure are stacked.

FIG. 7 is an exploded perspective view showing that the 3rd and 4th battery modules 60-3, 60-4 among four battery modules included in the battery module assembly 50 according to an embodiment of the present disclosure are stacked.

Referring to FIG. 7, a plate 54 is coupled to a high potential terminal of the 3rd battery module 60-3. In addition, a plate 55 is coupled to a low potential terminal of the 3rd battery module 60-3. The cells 62-3 included in the 3rd battery module 60-3 may be electrically connected in parallel by means of the plates 54, 55.

A plate 56 is coupled to a high potential terminal of the 4th battery module 60-4. In addition, a plate 57 is coupled to a low potential terminal of the 4th battery module 60-3. The cells 62-4 included in the 4th battery module 60-4 may be electrically connected in parallel by means of the plates 56, 57.

Referring to FIG. 7, it may be found that the 3rd battery module 60-3 and the 4th battery module 60-4 are respectively stacked on the 1st battery module 60-1 and the 2nd battery module 60-2 arranged in parallel.

The 3rd battery module 60-3 is electrically connected to the 1st battery module 60-1 in series. Therefore, the low potential terminal of the 3rd battery module 60-3 is stacked to be adjacent to the high potential terminal of the 1st battery module 60-1.

In addition, the 4th battery module 60-4 is electrically connected to the 2nd battery module 60-2 in series. Therefore, the high potential terminal of the 4th battery module 60-4 is stacked to be adjacent to the low potential terminal of the 2nd battery module 60-2.

According to an embodiment of the present disclosure, a protrusion 66 is formed on a top of the upper frame 61 of the battery module 60, and an indent portion 66-1 having a shape and location corresponding to the protrusion 66 is formed in a bottom of the lower frame 63.

Referring to FIGS. 3 to 5 again, it may be found that the protrusion 66 is formed at the top of the upper frame 61 according to an embodiment of the present disclosure, and the indent portion 66-1 having a shape and location corresponding to the protrusion 66 is formed at the bottom of the lower frame 63.

As described above, in the battery pack 1 according to an embodiment of the present disclosure, four battery modules 60 configure the battery module assembly 50 (see FIG. 2). At this time, when the battery modules 60-1 to 60-4 are stacked vertically, the protrusion 66 and the indent portion 66-1 may fix locations of the battery module located at the above and the battery module located at the below. In addition, when the battery modules 60-1 to 60-4 are stacked by means of the protrusion 66 and the indent portion 66-1, the battery modules 60 may be easily stacked, and it is also possible to prevent the upper battery module 60 and the lower battery module 60 from deviating from proper locations.

When the protrusion 66 and the indent portion 66-1 are formed at the 1st and 3rd battery modules 60-1, 60-3, the 1st battery module 60-1 and the 3rd battery module 60-3 may be mechanically connected by means of the protrusion 66 and the indent portion 66-1. In addition, when the protrusion 66 and the indent portion 66-1 are formed at the 2nd and 4th battery modules 60-2, 60-4, the 2nd battery module 60-2 and the 4th battery module 60-4 may be mechanically connected by means of the protrusion 66 and the indent portion 66-1.

Meanwhile, the 1st battery module 60-1 and the 3rd battery module 60-3 may be mechanically and electrically connected by means of the vertically folded region 51-a of the plate 51. In addition, the 2nd battery module 60-2 and the 4th battery module 60-4 may be mechanically and electrically connected by means of the vertically folded region 52-a of the plate 52. At this time, the mechanical connection may be made using the thread 68 formed at the lower frame of the 3rd battery module 60-3, the vertically folded region 51-a of the plate 51 and screws. Similarly, the mechanical connection may also be made using the thread 68 formed at the upper frame of the 4$^{th}$ battery module 60-4, the vertically folded region 51-a of the plate 51 and screws.

Figure 8:
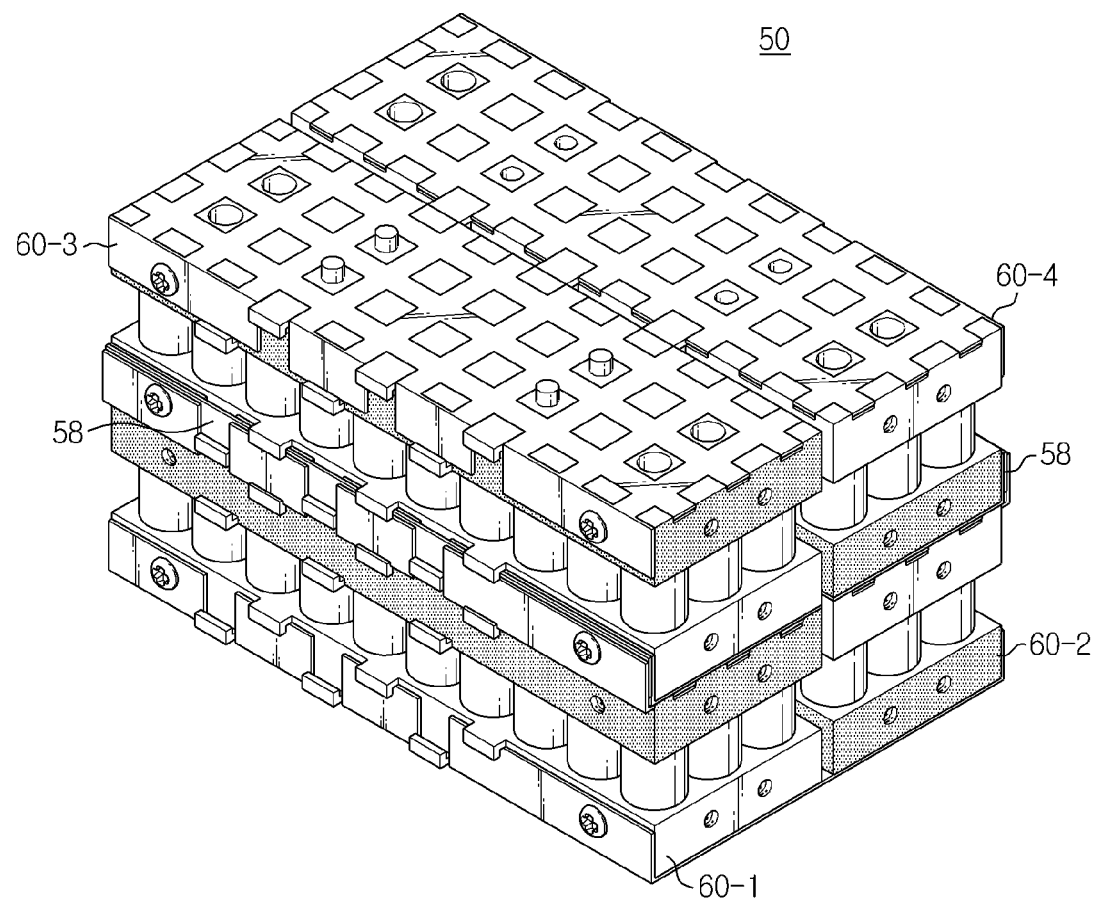
FIG. 8 is a perspective view showing a battery module assembly according to an embodiment of the present disclosure.

FIG. 8 is a perspective view showing a battery module assembly 50 according to an embodiment of the present disclosure.

Referring to FIG. 8, it may be found that the battery modules 60-1 to 60-4 depicted in FIGS. 4 to 7 are mechanically and electrically connected.

According to an embodiment of the present disclosure, the battery modules 60 stacked vertically, namely the 1$^{st}$ battery module 60-1 and the 3$^{rd}$ battery module 60-3, and also the 2$^{nd}$ battery module 60-2 and the 4$^{th}$ battery module 60-4 are electrically connected in series by means of a bus bar 58. The bus bar 58 may also be connected between the 1$^{st}$ battery module 60-1 and the 3$^{rd}$ battery module 60-3 and between the 2$^{nd}$ battery module 60-2 and the 4$^{th}$ battery module 60-4 by means of screws.

According to the present disclosure, it is possible to provide a stable and economic battery module assembly including a plurality of secondary battery cells.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery module assembly having four battery modules, among which two battery modules are arranged side by side and two battery modules are stacked and provided on the two battery modules arranged side by side,
   wherein cylindrical secondary battery cells respectively included in the battery modules are electrically connected in parallel by means of plates respectively disposed at tops of the two battery modules arranged side by side,
   wherein the two battery modules arranged side by side are electrically connected in series by means of a lower metal plate disposed on the two battery modules arranged side by side,
   wherein cylindrical secondary battery cells respectively included in the battery modules are electrically connected in parallel by means of metal plates respectively disposed at tops and bottoms of the two battery modules stacked on the two battery modules arranged side by side, and
   wherein the four battery modules are electrically connected in series.

2. The battery module assembly according to claim 1, wherein the metal plate is made of any one selected from the group consisting of nickel, copper, brass and nickel-plated copper.

3. The battery module assembly according to claim 1, wherein the metal plate is connected to the cylindrical secondary battery cells included in each battery module by means of resistance welding, ultrasonic welding, laser welding or conductive adhesive.

4. The battery module assembly according to claim 1, wherein the metal plate has a thickness of 0.1 mm to 0.4 mm.

5. The battery module assembly according to claim 1, further comprising a bus bar configured to electrically connect the two battery modules arranged side by side and the two battery modules stacked thereon.

6. The battery module assembly according to claim 5, wherein the plates respectively disposed at the tops of the two battery modules arranged side by side have a greater area in comparison to each battery module,
   wherein a region of each plate beyond the area of the battery module is vertically folded, and
   wherein the bus bar is interposed between the vertically folded region and the plates respectively disposed at the bottoms of the stacked two battery modules.

* * * * *